US007958093B2

(12) United States Patent
Anderson et al.

(10) Patent No.: US 7,958,093 B2
(45) Date of Patent: Jun. 7, 2011

(54) OPTIMIZING A STORAGE SYSTEM TO SUPPORT SHORT DATA LIFETIMES

(75) Inventors: Kay Schwendimann Anderson, Washington, DC (US); Frederick Douglis, Basking Ridge, NJ (US); Nagui Halim, Yorktown Heights, NY (US); John Davis Palmer, San Jose, CA (US); Elizabeth Suzanne Richards, Columbia, MD (US); David Tao, Glen Burnie, MD (US); William Harold Tetzlaff, Emeryville, CA (US); John Michael Tracey, Scarsdale, NY (US); Joel Leonard Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 10/944,597

(22) Filed: Sep. 17, 2004

(65) Prior Publication Data

US 2006/0072400 A1    Apr. 6, 2006

(51) Int. Cl.
*G06F 17/00* (2006.01)

(52) U.S. Cl. ........ 707/662; 707/610; 707/640; 707/661; 707/667; 707/672; 707/673; 707/674; 707/687; 707/758; 707/781; 707/812; 707/822; 709/203; 709/204; 709/205; 709/206; 711/100; 719/311; 719/315; 719/316

(58) Field of Classification Search .................. 707/206, 707/10, 610, 640, 661, 662, 667, 672, 673, 707/674, 687, 758, 781, 812, 822, 999.01, 707/999.107, 999.202, 999.204; 709/203, 709/223, 245, 204, 205, 206; 369/47.1; 711/100; 719/311, 315, 316

See application file for complete search history.

(56) References Cited

U.S. PATENT DOCUMENTS

| 5,513,336 | A  | * | 4/1996  | Vishlitzky et al. | ............ 711/136 |
| 6,073,142 | A  | * | 6/2000  | Geiger et al.     | ............ 715/205 |
| 6,446,188 | B1 | * | 9/2002  | Henderson et al.  | ............ 711/206 |
| 6,615,318 | B2 | * | 9/2003  | Jarvis et al.     | ............ 711/133 |
| 6,671,766 | B1 | * | 12/2003 | Vandenbergh et al.| ............ 711/160 |
| 6,678,793 | B1 | * | 1/2004  | Doyle             | ............ 711/133 |

(Continued)

OTHER PUBLICATIONS

Title: How to set AutoArchive Date: Sep. 9, 2003 Pertinent pp. 7 Publisher: exchange.sandi.net/info/pdf/How%20to%20set%20AutoArchive%20.pdf Riding the Wave of Technology.*

(Continued)

*Primary Examiner* — Syling Yen
(74) *Attorney, Agent, or Firm* — Yee & Associates, P.C.; William Stock

(57) ABSTRACT

A system and method for optimizing a storage system to support short data object lifetimes and highly utilized storage space are provided. With the system and method, data objects are clustered based on when they are anticipated to be deleted. When an application stores data, the application provides an indicator of the expected lifetime of the data, which may be a retention value, a relative priority of the data object, or the like. Data objects having similar expected lifetimes are clustered together in common data structures so that clusters of objects may be deleted efficiently in a single operation. Expected lifetimes may be changed by applications automatically. The system automatically determines how to handle these changes in expected lifetime using one or more of copying the data object, reclassifying the container in which the data object is held, and ignoring the change in expected lifetime for a time to investigate further changes in expected lifetime of other data objects.

29 Claims, 8 Drawing Sheets

U.S. PATENT DOCUMENTS

| | | | |
|---|---|---|---|
| 6,732,237 B1* | 5/2004 | Jacobs et al. | 711/119 |
| 6,757,708 B1* | 6/2004 | Craig et al. | 709/203 |
| 6,983,318 B2* | 1/2006 | Doyle | 709/223 |
| 7,020,658 B1* | 3/2006 | Hill | 707/102 |
| 2002/0078077 A1* | 6/2002 | Baumann et al. | 707/206 |
| 2002/0083006 A1* | 6/2002 | Headings et al. | 705/59 |
| 2004/0078518 A1 | 4/2004 | Kuwata | |
| 2005/0097260 A1* | 5/2005 | McGovern et al. | 711/100 |
| 2006/0106852 A1 | 5/2006 | Siddall et al. | |
| 2006/0190924 A1 | 8/2006 | Bruening et al. | |
| 2006/0200700 A1* | 9/2006 | Malcolm | 714/38 |

OTHER PUBLICATIONS

Blackwell et al., "Heuristic Cleaning Algorithms in Log-Structured File Systems", In Proceedings of the Winter 1995 USENIX Conference, Jan. 1995.

Chandrasekaran et al., "TelegraphQC: Continuous Dataflow Processing for an Uncertain World", In Proceedings of the First Biennial Conference on Innovative Data Systems Research (CIDR), 2003.

Gärtner et al., "Efficient Bulk Deletes in Relational Databases", In proceedings of the 17th International Conference on Data Engineering, Heidelberg, Germany, Apr. 2001, IEEE.

Gavish et al., "Dynamic File Migration in Distributed Computer Systems" Communications of the ACM, 33(2):177-189, 1990.

Raxco Software, Inc., "A tutorial on disk defragmentation for windows nt/2000/xp and windows server 2003", http://www.raxco.com/products/perfectdisk2k/whitepapers/defrag_tutorial.pdf, May 2003.

Iyer et al., "Anticipatory scheduling: A disk scheduling framework to overcome deceptive idleness in synchronous I/O", in Symposium on Operating Systems Principles, pp. 117-130, 2001.

McKusick et al., "A Fast File System for Unix", ACM Transactions on Computer Systems, 2(3): 181-197, Aug. 1984.

Menon et al., "An Age-Threshold Algorithm for Garbage Collection in Log-Structured Arrays and File Systems", IBM Research Report RJ 10120, 1998.

Ousterhout et al., "Beating the I/O bottleneck: A Case for Log-Structured File Systems", ACM Operating Systems Review, 23(1):11-28, Jan. 1989.

Patterson et al., "Informed Prefetching and Caching", in Proceedings of the Fifteenth ACM Symposium on Operating Systems Principles, pp. 79-95, Dec. 1995.

Rosenblum et al., "The Design and Implementation of a Log-Structured File System", ACM Transactions on Computer Systems, 10(1):26-52, Feb. 1992.

Santry et al., "Deciding when to forget in the Elephant file system", In Symposium on Operating Systems Principles, pp. 110-123, 1999.

Seltzer et al., "An Implementation of a Log-Structured File System for UNIX", In Proceedings of the Winter 1993 USENIX Conference, pp. 1-18, Jan. 1993.

Wang et al., "Wolf—a Novel Reordering Write Buffer to Boost the Performance of the Log-Structured File Systems", In Proceedings of the First USENIX Conference on File and Storage Technologies, Monterey, CA, 2002.

Wilkes et al., "The HP Autoraid hierarchical storage system", ACM Transactions on Computer Systems, vol. 14, No. 1., Feb. 1996.

Zdonik et al., "The Aurora and Medusa Projects", Bulletin of the IEEE Computer Society Technical Committee on Data Engineering, pp. 1-8, 2003.

Anderson et al., System and Method for Optimizing a Storage System to Support Full Utilization of Storage Space, Sep. 17, 2004.

\* cited by examiner

OPTIMIZING A STORAGE SYSTEM TO SUPPORT SHORT DATA LIFETIMES

GOVERNMENT RIGHTS

This invention was made with Government support under Contract No.: TIA H98230-04-3-0001awarded by the U.S. Department of Defense. The Government has certain rights in this invention.

RELATED APPLICATION

This application is related to commonly assigned and co-pending U.S. patent application Ser. No. 10/943,397 entitled "System and Method for Optimizing a Storage System to Support Full Utilization of Storage Space," filed on even data herewith and hereby incorporated by reference.

BACKGROUND OF THE INVENTION

1. Technical Field

The present invention is generally directed to an improved data processing system. More specifically, one aspect of the present invention is directed to a system and method for optimizing a storage system, such as a file system, to support short data lifetimes, e.g., short file lifetimes or short object lifetimes. A second aspect of the present invention is directed to a system and method for optimizing a storage system, such as a file system, using priority based retention of data objects, e.g., files, so as to support full utilization of storage space.

2. Description of Related Art

Early file systems were designed with the expectation that data would typically be read from disk many times before being deleted. Therefore, on-disk data structures were optimized for reading of data. However, as main memory sizes increased, more read requests could be satisfied from data cached in memory. This motivated file system designs that optimized write performance rather than read performance. However, the performance of such system tends to suffer from overhead due to the need to garbage collect current, i.e. "live," data while making room for areas where new data can be written.

New types of systems are evolving in which, in addition to reading and writing of data, creation and deletion of data are important factors in the performance of the system. These systems tend to be systems in which data is quickly created, used and discarded. These systems also tend to be systems in which the available storage system resources are generally fully utilized. In such systems, the creation of data and deletion of this data is an important factor in the overall performance of the system.

However, known file systems, which are optimized for data reads or, alternatively, data writes, do not provide an adequate performance optimization for this new breed of systems. Therefore, it would be advantageous to have a system and method that optimizes, in addition to data reads and writes, the creation and deletion of data.

All file systems have the capability for the explicit deletion of files by a program or user. Some file systems have provision for a timed delete of a file, previously scheduled by a user or program. If more files are created than deleted, eventually the system will fill, and writing new files is no longer possible. The current state of the art is tools that an administrator can use to explicitly delete files. The implication is that an administrator is forced to make decisions about the value of objects, and instigate deletion of lower value files. Therefore, it would be advantageous to have a system and method that automatically selects data to delete, retaining the most highly valued data that can fit into a file system at any given time.

SUMMARY OF THE INVENTION

The present invention provides a system and method for optimizing a storage system, such as a file system, to support short file lifetimes and highly utilized storage space. With a preferred embodiment of the system and method of the present invention, data objects may be clustered based on when they are anticipated to be deleted. That is, when an application stores data to a particular location, the application provides an indication of the useful life of the data, e.g., a relative priority or retention value (or value function) of the data object. Data objects having similar relative priorities may be clustered together in a common data structure so that clusters of objects may be deleted efficiently in a single operation. The use of these relative priorities, rather than merely waiting for data to be explicitly deleted, enables a storage system to adapt to changing priorities of different data objects, even when the storage space is fully utilized. In addition, bulk deletion allows storage space to be reclaimed efficiently and in a scalable manner.

Relative priorities may be changed by applications explicitly or implicitly. The system automatically determines how to handle these changes in relative priority using a plurality of mechanisms. These mechanisms may include, for example, copying the data object, reclassifying the container in which the data object is held, ignoring the change in relative priority for a time to investigate further changes in relative priority of other data objects, and ignoring the change indefinitely.

Moreover, the retention values of the data objects may be utilized with or without grouping of the data objects into common data structures, i.e. containers, so as to achieve a fully utilized storage system. That is, the retention values may be used such that when a fully utilized storage system needs to store new data objects/containers of data objects, data objects/containers are deleted based on the retention values so as to provide sufficient storage space for the new data objects/containers. This deletion may be performed based on a delete threshold, a sorted list of retention values for data objects/containers, or the like.

Thus, the present invention provides a first aspect of grouping data objects based on expected lifetimes of the data objects so that data objects having similar lifetimes may be deleted in bulk when necessary. In addition, the present invention provides a second aspect of the present invention that permits prioritization of data objects/containers based on their relative retention values such that data objects/containers are deleted in accordance with their relative retention values when necessary to ensure a fully utilized storage system. These aspects may be used separately or in combination to achieve a storage system that is optimized for short lifetime data objects and a continually full storage system.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
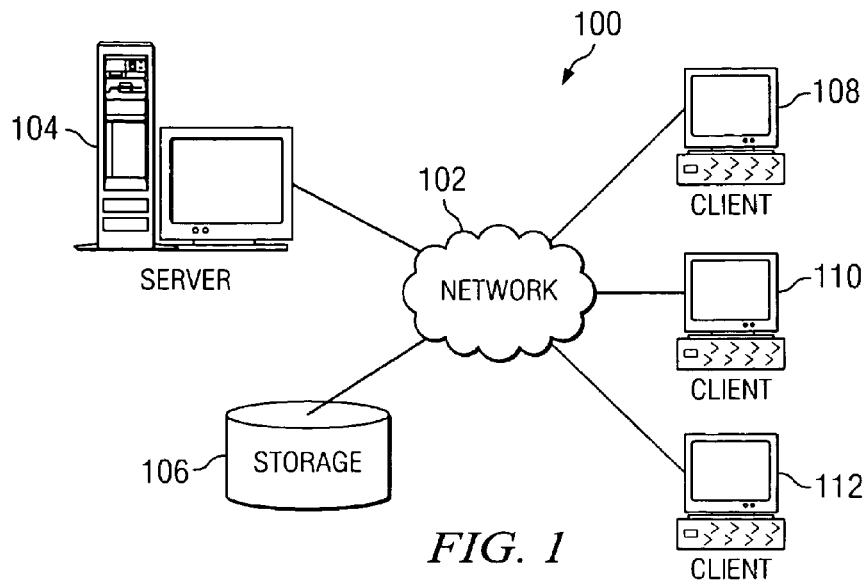
FIG. 1 is an exemplary diagram of a distributed data processing system in which aspects of the present invention may be implemented.
Figure 2:
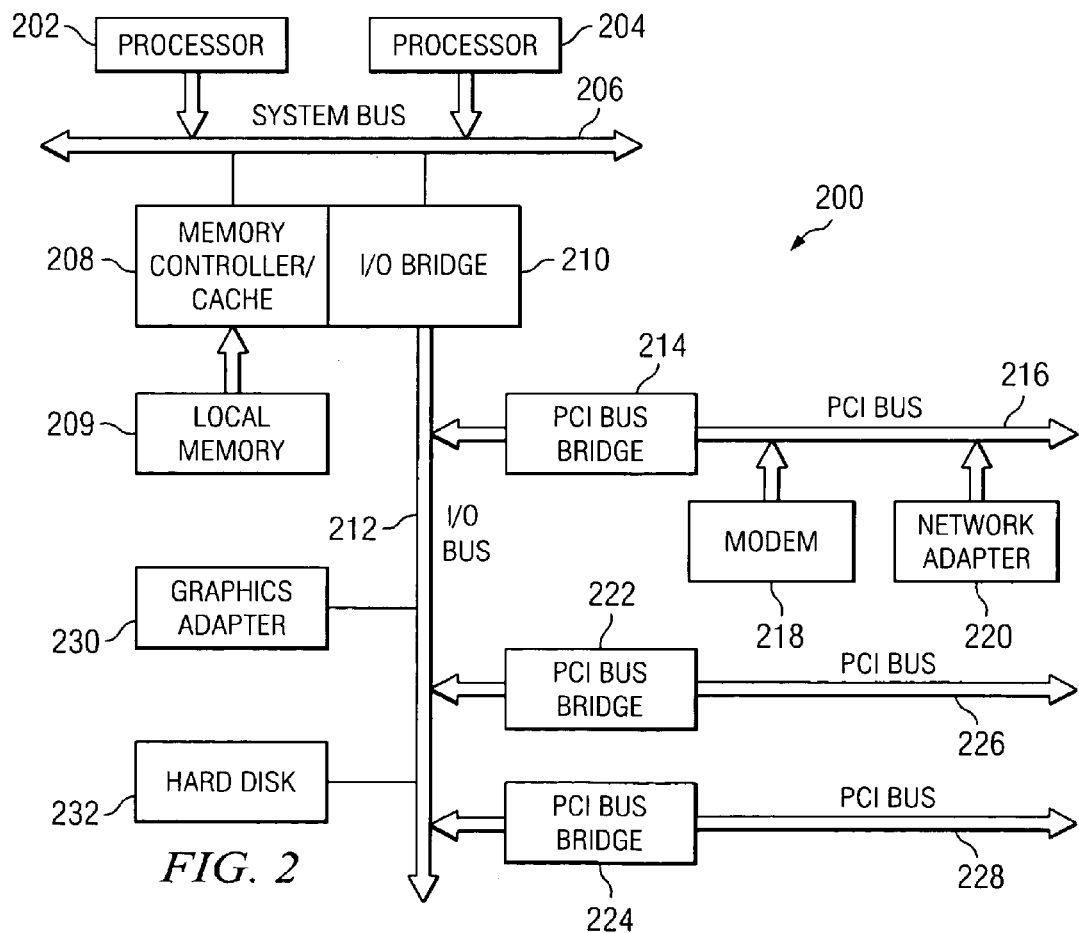
FIG. 2 is an exemplary block diagram of a server computing device in which aspects of the present invention may be implemented.
Figure 3:
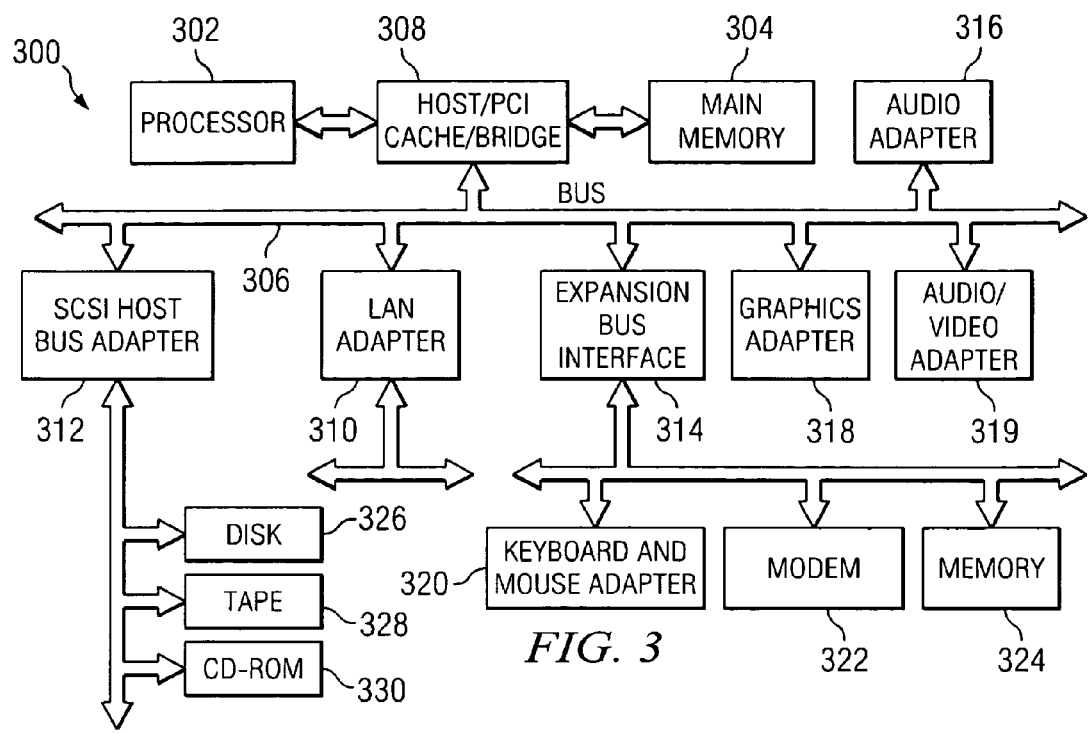
FIG. 3 is an exemplary block diagram of a client computing device in which aspects of the present invention may be implemented.

The present invention provides a system and method for optimizing a storage system under high loads. A first aspect of the present invention optimizes a storage system, such as a file system, to support short data lifetimes, e.g., short file lifetimes in a file system or short object lifetimes in an object storage system. A second aspect of the present invention provides a system and method for optimizing a storage system, such as a file system, using priority based retention of data objects so as to support a highly utilized storage system. The present invention may be implemented in a distributed data processing system, such as the Internet, a local area network, a wide area network, storage area network, or the like. In addition, the present invention may be implemented in a stand-alone computing system. In order to provide a context with regard to the types of computing devices in which the aspects of the present invention may be implemented, FIGS. 1-3 are described hereafter as example computing environments and computing devices in which aspects of the present invention may be implemented. It should be appreciated that FIGS. 1-3 are only exemplary and are not intended to state or imply any limitation with regard to the types of computing environments and/or computing devices in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), a storage area network (SAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides a system and method for optimizing a storage system, such as a file system, for short data object lifetimes and high storage utilization. In one aspect of the present invention, data is stored in association with other data having similar expected lifetimes to effectuate bulk deletions and to optimize the creation/deletion of data in the storage system. In one exemplary embodiment, data that is stored in association with each other may be deleted in bulk when predetermined criteria are met, e.g., a delete threshold is met. In other exemplary embodiments, mechanisms are provided for modifying the association of data based on changes to the expected lifetimes of the data.

In a second aspect of the present invention a system and method for optimizing a storage system, such as a file system, to run at close to 100% storage utilization are provided. In one exemplary embodiment of the present invention, portions of data having associated expected retention lifetimes are used along with a measure of storage system usage to determine when to delete data from the storage system. In another exemplary embodiment, a sorted list of retention values of portions of data, e.g., data objects or files, or containers of data is used to determine which portions of data to delete to make available storage space to store new portions of data. These and other aspects of the present invention will be described in detail in the description hereafter.

The present invention may be implemented in a distributed data processing environment or in a stand-alone computing system. For example, the present invention may be implemented in a server, such as server 104, or client computing device, such as clients 108-112. Moreover, aspects of the present invention may be implemented using storage device 106 in accordance with the present invention as described hereafter. The configuration of the present invention is based upon a number of observations made of log-structured file systems. Therefore, a brief explanation of a log-structure file system will first be made. In its earliest incarnation, the log-structured file system was envisioned as a single contiguous log in which data was written at one end of a wrap-around log and free space was created at the other end by copying "live" files to the first end. This had the disadvantage that long-lived data would be continually garbage collected, resulting in high overhead. The problem of long-lived data was solved by segmenting the log into many fixed-size units, which were large enough to amortize the overhead of a disk seek relative to writing an entire unit contiguously. These units, called "segments," were cleaned in the background by copying live data from segments with low utilization (i.e., most of the segment already consists of deleted data) to new segments of entirely live data. See "The Design and Implementation of a Log-Structured File System," by Rosenblum and Ousterhout, ACM Transactions on Computer Systems, 1991, which is hereby incorporated by reference.

One of the basic embodiments of the present invention is based on treating an entire file system as a wrap-around log, in which data objects are written once, then overwritten when the log wraps. Useful data may be copied to a more permanent storage location before the log wraps. The present invention does not entail any garbage collection and there are no specific guarantees that data will be retained. Files are deleted after some interval, the duration of which may be estimated in advance but may be determined in practice by the rate at which new data is written, for example.

The present invention is further expanded by observing that there may in fact be many logs, with potentially different storage allocations, thereby wrapping at different rates. A data object may be written to a particular log, resulting in it being overwritten when that log wraps. One log may wrap approximately every hour while another may wrap once per day, for example.

The present invention is further based on the observation that it is possible to use multiple segments to place data together that are expected to be deleted together. For instance, if an application knows that everything it creates in the next 5 minutes is likely to be deleted within 6 hours, then by placing all that data in one log-file system container, e.g., a segment, regardless of what else is being written, the entire container may be reclaimed in 6 hours without any cleaning overhead.

As a further enhancement made by the present invention, improved performance may be obtained by allowing for best-effort retention of data objects. This best-effort retention may be performed with regard to individual objects, containers of objects, or a combination of individual objects and containers of objects. With this further enhancement, the system can choose to delete objects, rather than copy them to new containers or segments, based on a priority that has been specified for retaining the data objects. In one exemplary embodiment of this type, containers or segments have a priority that is tied to the priority of the objects they contain. When an object's priority changes, the system makes a determination whether to leave the container alone, change the priority of the container, or copy the object to a new container. This determination may be deferred until any time before the container is actually permitted to be overwritten. Priorities can vary over time, but they can also be determined by other criteria such as access patterns.

In an alternative embodiment, rather than prioritizing data objects based on containers, a plurality of data objects may be provided that are each associated with a respective retention value that identifies a relative importance for storing the data object in the storage system as compared to other data objects having different retention values. These data objects are stored in the storage system in association with their respective retention values. The retention values provide a mechanism by which a relative priority for retention of data objects may be determined based on the associated retention values of the data objects. Based on this relative priority of retention of data objects, when it is necessary to free storage space for new objects, existing data objects may be deleted in accordance with the determined relative priority for retention of the data objects until a sufficient amount of storage space for the new objects has been freed.

Figure 4:
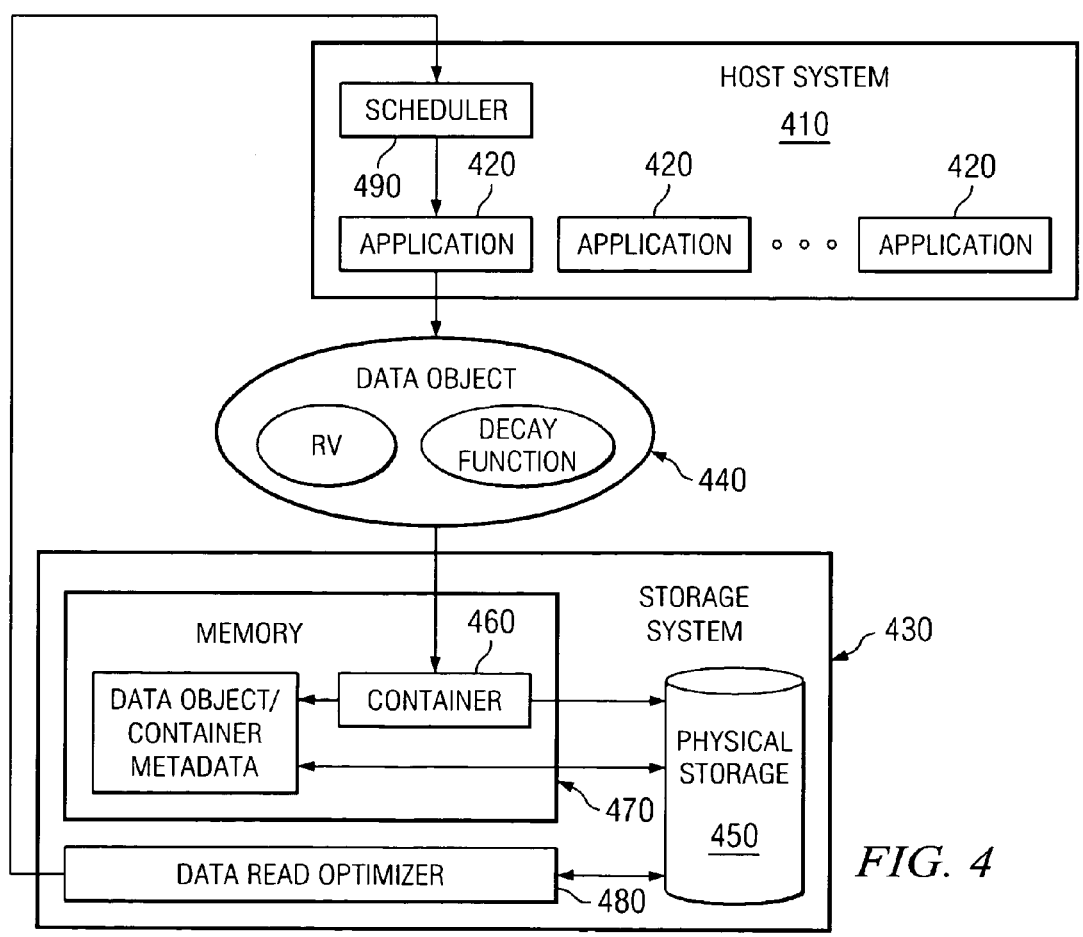
FIG. 4 illustrates an exemplary mechanism by which data may be stored in a data storage system in accordance with one exemplary embodiment of the present invention.

With these observations in mind, FIG. 4 illustrates a method by which data may be stored in a data storage system in accordance with one exemplary embodiment of the present invention. As shown in FIG. 4, a host system 410 includes one or more applications 420 which may store and retrieve data from storage system 430. The host system 410 may be separated from the storage system 430 and in communication with the storage system 430 via communication links, such as via a local area network, a wide area network, the Internet, or the like. Alternatively, the storage system 430 may be integrated with the host system 410 in the same computing system.

As illustrated in FIG. 4, the application 420 may store data objects 440 in the storage system 430. The data objects 440 may be of arbitrary size. Many data objects 440 will be just a few bytes in size. While some data objects 440 may be discarded immediately and never make it to secondary storage, e.g., physical storage device 450, a substantial amount of data objects 440 will be written to physical storage device 450, e.g., hard disk, magnetic tape, etc., read once or a small number of times, and then quickly deleted. Depending on system load and priorities, some data objects 440 may be deleted before ever being read. A relatively small fraction of the data objects 440 will be retained for a long time and read repeatedly. In this environment, it is observed that as data object lifetimes become short, and all other things are equal, Little's Law requires that a fixed-size storage system will have increasing create/delete rates, i.e. rates at which data objects 440 are created in physical storage system 450 and deleted from physical storage system 450. Since creates/deletes may involve random disk I/O, and disk technology is progressing faster in density than access rate, this will become increasingly important in the performance optimization of future storage systems.

Two key notions in the design of the storage system of the present invention, i.e. characteristics of data storage that are sought to be supported by the present invention, are immutability and relative valuation. First, data objects 440 are immutable once created. Thus, the only operations on data objects that involve their data are to write them initially, read them, or delete them.

Second, there are additional operations to affect the metadata of a data object, particularly its retention value (RV). When a data object 440 is created, it is given a current retention value (CRV) that indicates the relative importance of keeping the data object 440, and a function defining how the CRV changes over time, e.g., either decaying or increasing over time. The terms "current retention value" (CRV) and simply "retention value" (RV) are used interchangeably herein. For purposes of the present description it is assumed that the function defines a decay of the CRV, i.e. that the function is a decay function, since this is the most probable implementation for ensuring that a storage system does not become over utilized. However, it should be appreciated that an increasing CRV function may be used without departing from the spirit and scope of the present invention. Thus, objects 440 may naturally age out of the storage system 430 over time based on their initial retention value, i.e. the CRV of the objects 440 when they are first stored in the storage system 430, and the decay function associated with the data object 440.

In one exemplary embodiment, data objects 440 themselves may not be assigned the function but rather the container 460 to which the data objects 440 are assigned has the associated function and a container 460 retention value that is determined based on the current retention values of the data objects 440 within the container 460. That is, for example, when an application wishes to write a data object 440 to the data storage system 430, the application 420 initiates storage of the data object 440 by instructing the data storage system 430 to prepare for receipt of a data object 440 having a particular retention value and decay function. In actuality, the application 420 will typically initiate a stream of data objects 440 that are destined for a container 460 in the storage system 430. In response, the storage system 430 initiates a data container 460 in which the data objects 420 having a same or similar retention value are maintained. A plurality of containers 460 may be established for data objects having different retention values and/or decay functions. The way in which these containers 460, their retention values, and decay functions, are used to manage storage of data objects in a prioritized manner and perform bulk deletions will be described in greater detail hereafter.

Another aspect of the storage system 430 is that there may exist some applications 420 that are designed to take data objects along a pipeline, often in an arbitrary order. Rather than an application 420 requesting a specific data object 440 and suffering the latency of retrieving that data object 440, through use of the present invention, applications may be designed to receive a stream of data objects, the order of which is dictated by a resource manager. For example, a web crawler that processes retrieved pages may not be concerned with pages it processes first, only that it processes all recently crawled pages in some order.

The retention values (RVs) and current retention values (CRVs) and their associated decay functions may be absolute terms for identifying how long a data object 440 is to be retained in the storage system 430 or may be regarded as only hints or suggestions about how long to retain a data object 440 in the storage system 430. In other words, there are no absolute guarantees as to how long data objects will be retained in the storage system 430. Thus, unlike traditional file systems that write a file and then ensure the availability of that file until it is deleted or overwritten, the storage system 430 of the present invention writes a data object 440 to physical storage device 450, maintains a metadata entry for the data object and its associated container 460 in either memory or other data storage, e.g., disk, and then makes a good-faith effort to retain the data object 440 in the physical storage device 450 in accordance with its specified RV. As data objects are processed, their processing can affect the RV of various data objects (themselves or others), causing them to be retained for longer or shorter periods. However, the storage system 430 is designed with the expectation that explicit updates to existing RVs are relatively uncommon. In a steady state, most data objects will not explicitly change their RV before deletion. For example, in some implementations of the present invention, only approximately 10-20% of data objects will explicitly change their RV before deletion. Most data objects will have their RV changed implicitly through the use of a decay function, but all objects within a container will have similar decay, thus there will be no relative change between two objects in a single container.

The large number of small data objects typically encountered requires some form of aggregation to amortize I/O overheads. Clustering objects into collections of data, all written contiguously, makes sense from the standpoint of write performance. However, units such as the segments used in log-structured file systems can suffer from high overheads from garbage collection when the overall storage utilization is moderately high. If there are no segments without any "live" data, the system must garbage-collect to coalesce live data into fewer segments and create entirely empty segments to be reused. In contrast, deleting an entire empty segment at once, without the need to copy "live" data to a new segment, can improve performance dramatically.

The key to such performance gains is the ability for applications 420 to predict, at object creation time, which data objects 440 are likely to be deleted together, i.e. have the same expected life time. By clustering data objects 440 into different groups that depend on their anticipated lifetime, the system can create segments that can be reclaimed in their entirety at an appropriate time without the need for cleaning. These groups or collections are the storage containers 460 previously mentioned above.

As data objects 440 are created by applications 420, they are annotated with an initial retention value, e.g., a value between 0 and 1, with 1 referring to data objects that should be retained if at all possible. The data objects 440 are also annotated with a decay function that specifies the anticipated retention decay of the object's data. As mentioned above, rather than associating the decay function with the data objects, however, in another alternative embodiment, the decay function may be associated with the data container 460 in which the data object 440 is stored.

Figure 5:
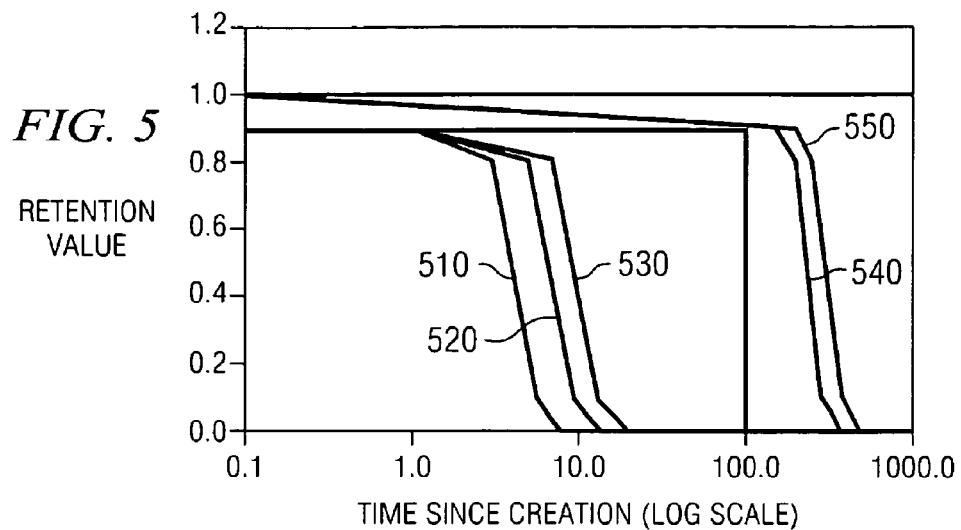
FIG. 5 provides examples of decay curves that may be used with data objects in accordance with an exemplary embodiment of the present invention.

FIG. 5 provides examples of decay curves that may be used with data objects in accordance with an exemplary embodiment of the present invention. FIG. 5 shows curves 510, 520, 530, 540, and 550, which represent different retention values as a function of time. Curves 510, 520, and 530 represent decay curves that transition from a high value to a low value in the space of a small number of time units (for example 10-30 minutes), while curves 540 and 550 are "long-term" decay curves that cause retention values to stay high for a prolonged period (for example, days) before falling. These curves are merely illustrative and many other possible decay curves are possible.

A decay function, in the present storage system 430, may either provide an indication of the actual time that the data object will be retained or may be just a statistical formulation that is not a guarantee of retention time of the data object. That is, in one exemplary embodiment, since retention values may be modified by applications outside the operation of the decay function, and dynamic utilization of the storage system may be used to determine what data objects should be deleted, some data objects may be deleted long before they are anticipated to be deleted as the retention value would suggest. Similarly, some data objects may survive well past the expected point of deletion.

Current retention values (CRVs) and anticipated retention decays (ARDs) may be changed at any time by an application 420. The ARD is a value that indicates the expected lifetime of the data objects 440 as determined from the current retention values and the decay function. A container may have an associated ARD based on the ARD of the data objects that are, or are to be, stored in the container. A data object 440 whose retention value increases should be expected to survive longer in the data storage system 430. Similarly, a data object 440 whose retention value is decreased is expected to survive a shorter amount of time in the data storage system 430.

The pressure on the storage system 430 to store data objects is expected to vary over time. When the rate of data object writes surpasses the rate of data object deletions, the total storage utilization increases. Over short times, discrepancies between data object reads and writes are expected, but eventually they must be synchronized. This is accomplished by having a high water mark or threshold that defines a current retention level. Those data objects, or containers of data objects, that have retention values that are equal to or below the high water mark or threshold will be reclaimed, i.e. deleted. Those data objects, or containers of data objects, that have retention values that are above the high water mark or threshold will be retained in the storage system 430. As available storage space in the storage system 430, i.e. available storage space in the physical storage device 450, decreases below a predetermined minimum amount, the high water mark or threshold is increased. As the available storage space increases past this predetermined minimum amount, the high water mark or threshold may be reduced.

Thus, in summary, with a preferred embodiment of the present invention, applications 420 predict the useful life of data objects being generated by the applications 420 at data object creation time and associate a retention value and decay function with these data objects. The data objects are sent to the storage system 430 where the retention value and decay function are used to create a container 460 for the data objects 440. The container 460 contains data objects 440 having similar initial retention values and, optionally, decay functions. It should be noted that in an embodiment in which the decay functions are associated with the individual objects, each data object 440 may have its own decay function and thus, its retention value may decay at a different rate than other data objects within the same container 460.

The data objects 440 are first stored in the container 460. When either the container 460 is full, after a predetermined delay, or when the container 460 is manually flushed (i.e. written to disk or other "permanent" storage), the data objects in the container 460 are written to one or more segments in the physical storage device 450 to ensure integrity. Metadata referencing the container 460, and the data objects 440 in the container 460, is maintained within the memory 470 or may itself be stored in secondary storage. The retention values of the data objects 440 stored in the storage system 430 may be modified by the applications 420 and by application of the decay functions associated with the data objects. In addition, a delete threshold is established for determining which data objects to delete, e.g., mark for deletion or mark as available to be overwritten, from the physical storage device 450. This delete threshold may be dynamically increased or decreased as available storage space in the physical storage device 450 increases or decreases. Data objects 440 or containers 460 that have retention values that are below or equal to the delete threshold are marked for deletion while those that have retention values above the delete threshold are retained in the storage system 430.

As an alternative to using the delete threshold, in another embodiment of the present invention, a sorted list of stored object retention values may be maintained. When it is necessary to create additional room for new objects, this sorted list may be used to identify objects/containers that have a lowest retention value so that these data objects/containers may be deleted first until a required amount of storage space is freed. The sorted list may be updated dynamically as data objects are created/deleted. The sorted list may include an identifier of the data object/container and its retention value and may be sorted based on the retention value. Thus, rather than using a dynamically determined delete threshold, when the amount of storage space usage increases above a predetermined amount, the sorted list is provided as a mechanism for prioritizing or ranking which data objects/containers are to be deleted first prior to other data objects/containers.

With regard to the containers 460 referenced above, these containers take advantage of the combination of high data rates, rapid data object deletion, and predictable relative retention values. Any given combination of initial CRV and ARD is extremely likely to have a steady stream of new data objects being sent to the storage system 430. In such cases, these data objects are written to a storage container 460 that holds data objects having a particular retention value and optionally, a particular decay function. Thus, in some embodiments, the containers 460 specify a retention value that the data objects must initially have, in other embodiments, all of the data objects must have not only the same initial retention value but also the same decay function. For example, in one embodiment of the present invention, the container 460 stores data objects having a particular initial retention value and which were created within a predetermined time interval of each other. When the storage container 460 is full, or after an appropriate delay, it is written to disk in a single high-bandwidth operation with metadata for the container 460 and data objects 440 within the container 460 remaining in memory 470.

Grouping data objects by retention value and writing large containers 460 contiguously to the physical storage 450 in one high-bandwidth operation makes writing of data objects more efficient. Similarly, because the data objects are written predominantly in a contiguous manner in the physical storage 450, sequential reading of data objects is also made more efficient. That is, since many related data objects are stored in close proximity to one another in the physical storage 450, they will tend to be read together in a single large I/O operation at a later point.

As mentioned above, the applications 420 may be optimized to accept data that is provided with some ordering or may often be provided in an arbitrary order. There are two primary ways in which this ability is supported in the applications 420. First, applications 420 may be designed to have data objects pushed to them rather than having to request the data from the storage system 430. Rather than deciding what data objects to read, the applications 420 are designed to permit an external optimizer 480 to read the data objects that are the "best" available, e.g., due to the a combination of factors that include their expected time to live, the performance of reading particular objects, and inter-object dependencies. Even applications that decide on specific data objects to read can improve performance substantially by specifying a long list of data objects prior to actually accessing them and allowing the underlying storage system 430 to prefetch data as efficiently as possible. See "Informed Prefetching and Caching," by Patterson, et al., Proceedings of the 15th ACM Symposium on Operating System Principles, 1995, which is hereby incorporated by reference.

Second, in some embodiments] the host system 410 will always have more work to do than available resources. Therefore, its scheduler 490 can run those applications that have their data immediately available. With rare exceptions for high priority analysis, should an application need a specific data object read from physical storage 450, the added latency for that application is unimportant as long as the system as a whole consistently makes progress.

As discussed previously, with the present invention, retention values are permitted to change, either by explicit changing of the retention value by an application or by virtue of the decay function associated with a data object. In a preferred embodiment of the present invention, retention values are set as values between 0 and 1 with 1 denoting data objects that are not to be deleted until specifically deleted by an application. If applications 420 choose to set too many data objects to an absolute current retention value of 1, such that the storage system 430 runs out of storage space in physical storage device 450, an exception is triggered. An application 420 that wishes to increase the relative value of a data object can modify it to have a higher retention value, and the storage system 430 endeavors to keep the data object an appropriately longer interval, although as mentioned above, the retention value is only a suggestion as to how long to keep the data object and is not absolute.

Figure 6:
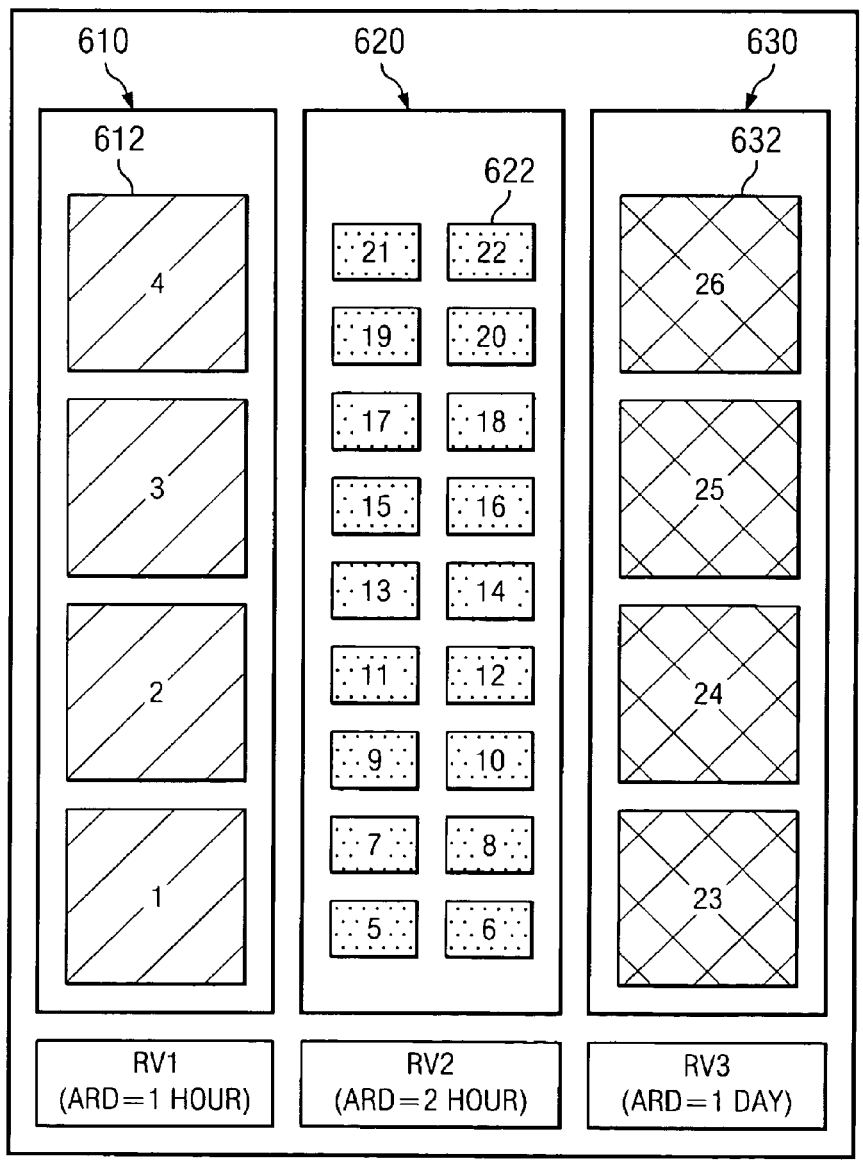
FIG. 6 is an exemplary diagram of a storage system in which three containers are provided in accordance with one exemplary embodiment of the present invention.

With the present invention, there are basically three approaches to handling changes in retention values of data objects in containers. These three approaches are illustrated with reference to FIGS. 6-8. FIG. 6 illustrates a storage system in which there are three containers 610, 620 and 630. Container 610 stores data objects 612 having a first retention value RV1 and a decay function that is equivalent to retaining the data objects 612 for approximately 1 hour in physical storage, i.e. the container 610 has an ARD of 1 hour. Container 620 stores data objects 622 having a second initial retention value RV2 and a decay function that is equivalent to retaining the data objects 622 for approximately 2 hours in physical storage, i.e. the container 620 has an ARD of 2 hours. Container 630 stores data objects 632 having a third initial retention value RV3 and a decay function that is equivalent to retaining the data objects 632 for approximately 1 day in physical storage, i.e. the container 630 has an ARD of 1 day or 24 hours.

It is assumed now that the retention values of objects within the containers 610-630 are modified, either directly by an application or through application of a decay function, associated with the data object, to the retention values. Most commonly, a decay function is applied to each object in a container, and the retention value of the container is adjusted accordingly. If not all objects are updated simultaneously, the system must address any discrepancies among the retention values of objects in the container. A first option for handling the change in retention value is to move any data object that has its retention value change such that it is inserted into a new storage container with an appropriate overall retention value. A consideration here is that occasional changes to retention values may not have the same steady-state behavior as a constant stream of external inputs, leading to a storage container being written when it is largely empty or, conversely, being kept in memory while the system attempts to fill it.

A variant of this first option is to write the changed object into an existing container. This can be done if an appropriate container has space, either because other objects have been deleted or moved, the container otherwise has not been completely filled, or because some space has been reserved in the first place for such move operations. Writing objects in an existing container is analogous to "hole-plugging" in a log-structured file system, as described in "The HP AutoRAID hierarchical storage system," by Wilkes, et al., ACM Transactions on Computer Systems, 1996, which is hereby incorporated by reference.

A second option is to ignore the change to the retention value of the data object entirely or to note the change and await a large enough aggregate change. Since all retention values are merely hints or suggests as to how long a data object will be retained in physical storage, it is acceptable to delete something "prematurely" if keeping it longer would present a hardship to the storage system as a whole. Thus, for example, as single data object with a retention value of 0.7 and an ARD of one day might be kept in a container having a retention value of 0.6 and an ARD of 12 hours. However, changing a second data object to a retention value of 0.7 may trigger copying the two objects to another container having an appropriate retention value and ARD or adjusting the entire container as described hereafter.

A third option is to affect the entire container in which the object resides. That is, for example, when a sufficient number of data objects within the container have their retention values modified such that the retention value of the container no longer accurately reflects the retention values of the data objects within the container, the retention value of the container may be modified. For example, the average retention value of the data objects within the container may be calculated and a determination may be made as to whether this average is significantly different from a current retention value of the container, e.g., an absolute value of the difference between the average retention value and the current retention value of the container is greater than a predetermined threshold. If the average retention value is significantly different from the current retention value, then the current retention value of the container may be modified to be the average (or other function, e.g., maximum) retention value of the data objects within the container.

These three options are implemented in the storage system as container policies that are applied during the management of containers in the storage system. The container policies determine when to move data objects from one container to another, when to keep data objects in the same container even though the retention value of the data objects have changed, when to modify the retention value and ARD of the container as whole based on changes to data objects within the container, and when to delete data objects/containers from the storage system. The application of these policies is illustrated with reference to FIGS. 7 and 8.

Figure 7:
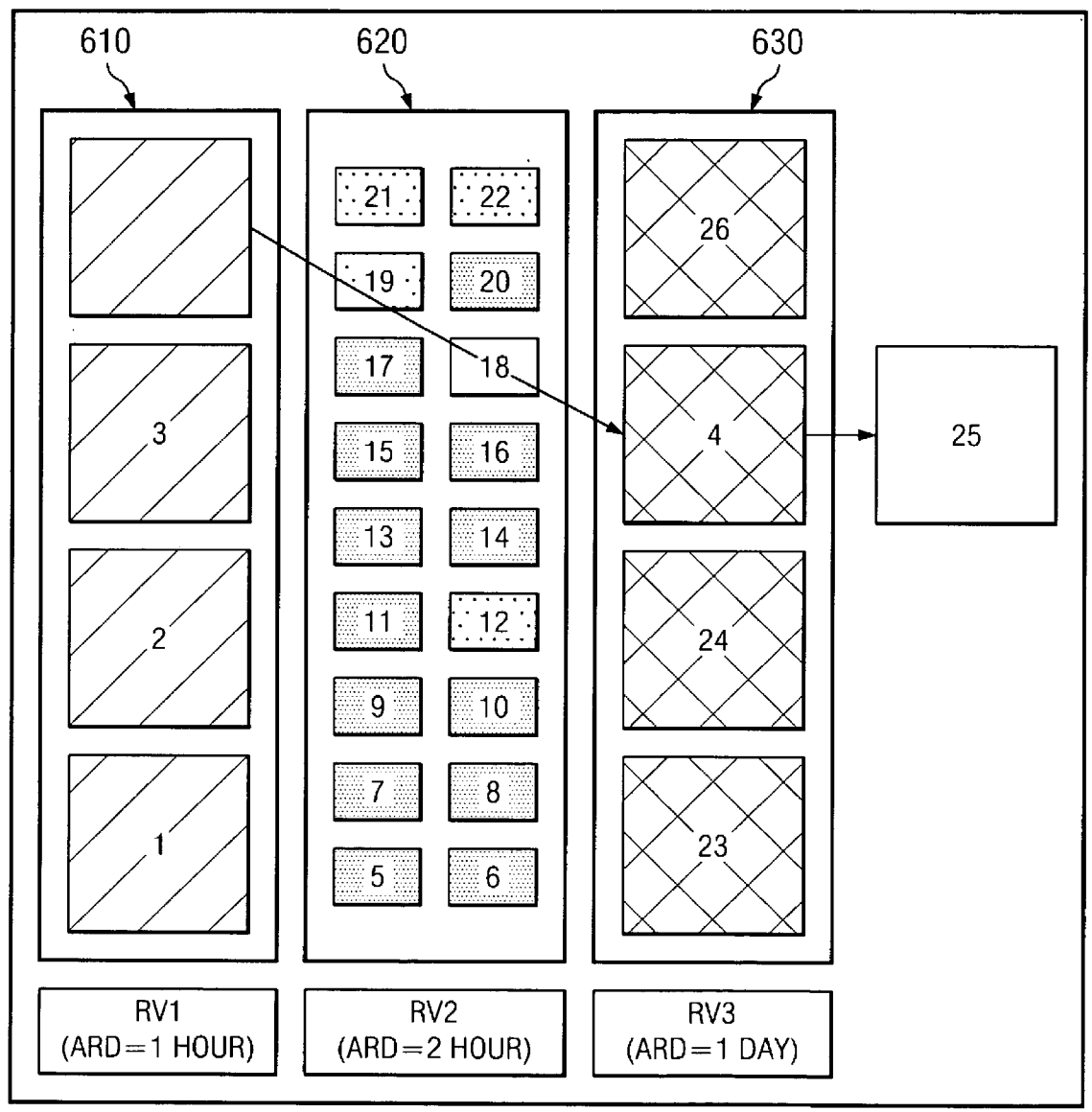
FIG. 7 is an exemplary diagram of the storage system of FIG. 6 in which retention values of data objects have changed and, as a result, some data objects have been moved between containers.

As shown in FIG. 7, data objects 12, 19, 21 and 22 have had their retention values changed such that the data objects are to be deleted from the storage system earlier. However, these data objects are kept in container 620 in accordance with the container policies. For example, the container policy may take an average of the retention values of data objects within container 620 and determine whether the absolute value of the average retention value is more than a threshold amount from the current retention value of the container 620.

If the absolute value of the average retention value is not more than a threshold amount from the current retention value of the container 620, a determination may be made as to whether there is space in another container having an appropriate retention value for the data objects that have had their retention values modified. If so, then the data objects that have had their retention values modified may be moved to this other container. This is illustrated in FIG. 7 with regard to data objects 4 and 25. As shown in FIG. 7, data object 25 is deleted from the storage system. This deletion may be an explicit deletion by an application or based on a comparison of data object 25's retention value and the current delete threshold for the storage system. For example, the retention value of data object 25 may be less than the current delete threshold and, as a result, data object 25 may be deleted from the storage system, e.g., marked as available to be overwritten. More likely, the deletion of data object 25 is an explicit deletion of the data object by an application rather than being based on a retention value falling below the delete threshold since all of the objects in container 630 have the same retention value and as such, the container 630 as a whole would have been deleted if the retention value fell below the delete threshold.

The deletion of data object 25 provides available storage space in container 630. Data object 4 has had its retention value modified to a higher retention value, such as by an application, so that it now corresponds with the retention value of container 630. Since there is available storage space in container 630 for data object 4, the application of the container policies to the management of the containers may result in data object 4 being copied into container 630 and deleted from container 610, as shown.

Figure 8:
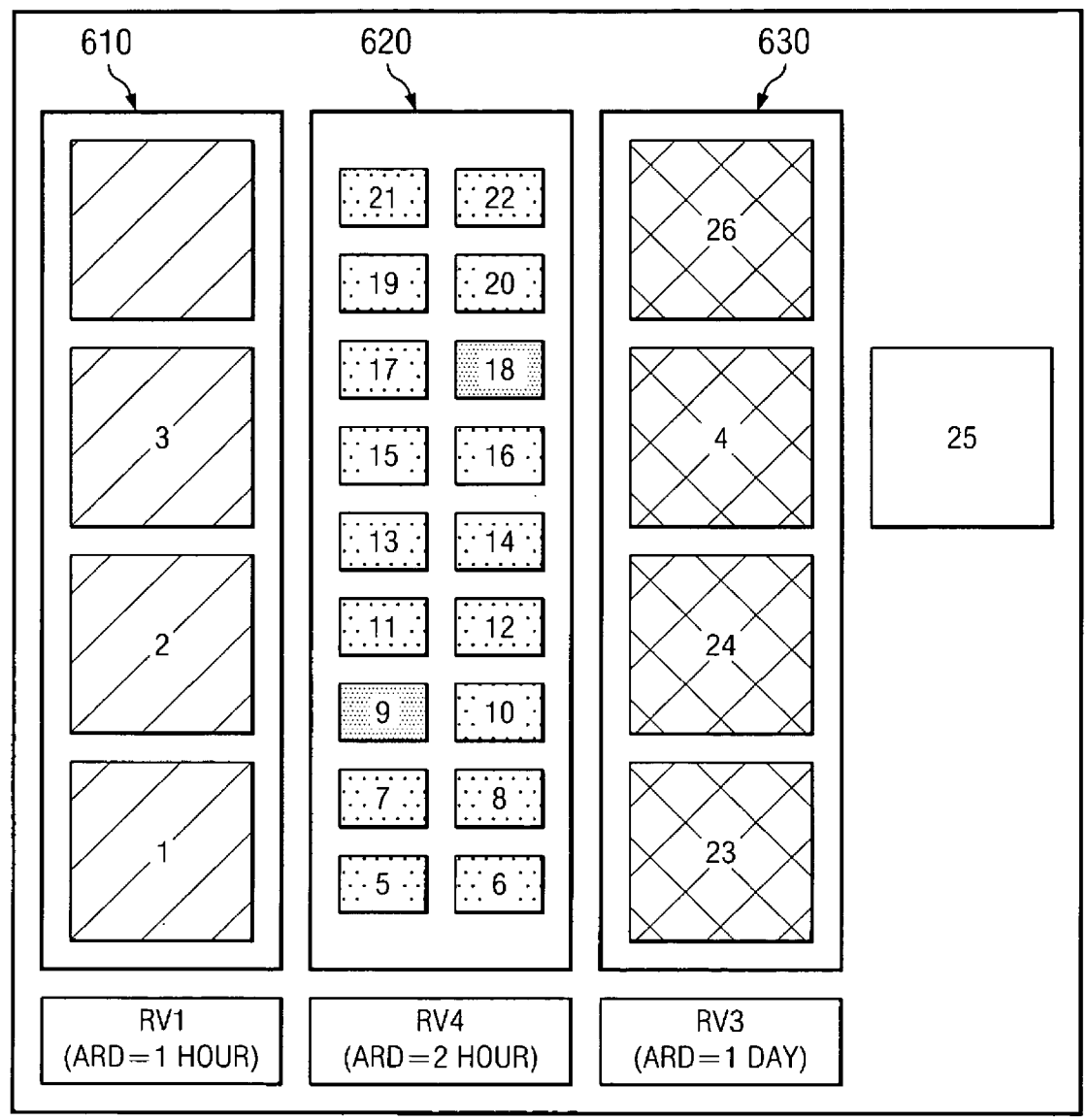
FIG. 8 is an exemplary diagram of the storage system of FIG. 7 in which retention values of data objects in a container have resulting in a change to the retention value of the container.

If the difference between the average retention value of the data objects and the retention value of the container is greater than the predetermined threshold, then the retention value of the container may be modified. This is shown in FIG. 8 where a majority of the data objects 622 in the container 620 have had their retention values modified. As a result, it is determined that the retention value of the container 620 should be modified to RV4 with a resulting ARD of 1 hour. It should be noted that the measurement of the "1 hour" ARD is based on the storage of the initial data object in the container 620. Thus, although the retention value, and thus, the resulting ARD, have changed, this does not mean that the data objects in the container are necessarily retained for a longer period of time, i.e. the time period for retention of the data objects is not restarted. Furthermore, it should be kept in mind that the retention values are only hints or suggestions and deletion of objects is based on a comparison of the dynamically updated delete threshold to the retention values of the data objects/containers.

As mentioned above, the delete threshold is a dynamically updated threshold that is tied to the current level of usage of the storage system. That is, as the level of usage of the storage system increases, the delete threshold, or high water mark, is updated so that more data objects/containers are likely to be reclaimed by the storage system, i.e. marked for deletion. As the level of usage of the storage system decreases, the delete threshold is updated so that less data objects/containers are likely to be reclaimed by the storage system. This updating of the delete threshold may be done on a continual basis, a periodic basis, or in response to the occurrence of a particular event or events. For example, in one embodiment of the present invention, the updating of the delete threshold may occur when data objects are added to containers, when data objects' retention values are modified, when container retention values are modified, or when data objects are moved from one container to another. In other exemplary embodiments, the delete threshold is performed periodically as retention values for the data objects and containers are updated based on application of decay functions to these retention values.

Moreover, in still other exemplary embodiments of the present invention, as described previously, rather than using a delete threshold, the present invention may make use of a sorted list of retention values for data objects and/or containers or data objects that prioritizes these data objects and/or containers based on their respective retention values. In this way, when new data objects and/or containers of data objects need to be stored in the storage system, other existing data objects and/or containers or data objects may be deleted from the storage system in accordance with the sorted list of retention values. In other words, those data objects/containers that have a lowest retention value may be deleted first until an appropriate amount of storage space is freed for the storing of the new data objects/containers. In this way, the system of the present invention permits the storage system to remain fully utilized while still permitting the storage of new data objects/containers in the storage system.

The above embodiments of the present invention assume that most retention values will exist between the values of 0 and 1, i.e. between a value indicating that the data object/container is not to be retained (e.g., 0) and a value indicating that the data object/container is never to be deleted (e.g., 1). In instances of the present invention in which the retention value indicates that the data object/container is not to be deleted, the mechanisms of the present invention are implemented. However, the mechanisms of the present invention may be modified so that data objects/containers that are identified as "permanent," i.e. never to be automatically deleted by operation of the present invention but must be expressly deleted, are written to physical storage in a portion of the physical storage reserved for "permanent" data objects/containers. Alternatively, this reserved portion of physical storage for "permanent" data objects/containers may be present on a separate physical storage from that used for storing other data objects/containers. That is, "permanent" data objects/containers may be moved from one storage system or storage device to another storage system or storage device.

Moreover, as mentioned above, the retention values of data objects/containers may be modified by application of the decay functions and/or explicitly modified by applications. This gives rise to the possibility that the retention value of a data object/container may be modified more often than desirable, e.g., retention value "thrashing." Such "thrashing" tends to increase the overhead of managing data objects/containers and thereby reduces the efficiency of the overall system.

Thresholds may be provided for identifying a maximum number of changes to a retention value within a period of time. When it is determined that a retention value of a data object/container has been modified more than a predetermined number of times within a predetermined period of time, the present invention may perform functions to minimize the affect of this "thrashing" on the operation of the present invention. These functions may include, for example, moving the data object/container to a different storage system or physical storage medium such that the data object/container is treated as a "permanent" data object/container. In this way, the data object/container is no longer subject to the management mechanisms of the present invention and instead must be specifically deleted by an application as in the conventional storage systems. In this way, data objects/containers that experience retention value "thrashing" are isolated from the remaining data objects/containers that do not experience this "thrashing."

Thus, the present invention provides a mechanism by which data objects are assigned a retention value, and optionally a decay function, that provides an indication of the life of the data object in the storage system. The retention value and decay function may be used to group the data object with other data objects having a similar retention value, and optionally decay function, in containers prior to writing the data objects to physical storage. The retention value may be modified by an application directly or by applying the decay function to the retention value of the data object. Data objects may be moved from one container to another based on a change in their retention value. Containers may have their retention values updated based on the changes to retention values of data objects in the container. Data objects/containers may be deleted when they have a predetermined relationship to a dynamically updated delete threshold that is tied to the current level of usage of the storage system. Alternatively, data objects/containers may be deleted in accordance with a sorted list of retention values. In this way, the present invention provides an improved data storage system in which data objects are written and deleted in bulk and data objects/containers are deleted without requiring explicit deletion commands from applications.

FIGS. 9-12 are flowcharts outlining various processes implemented by aspects of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 9:
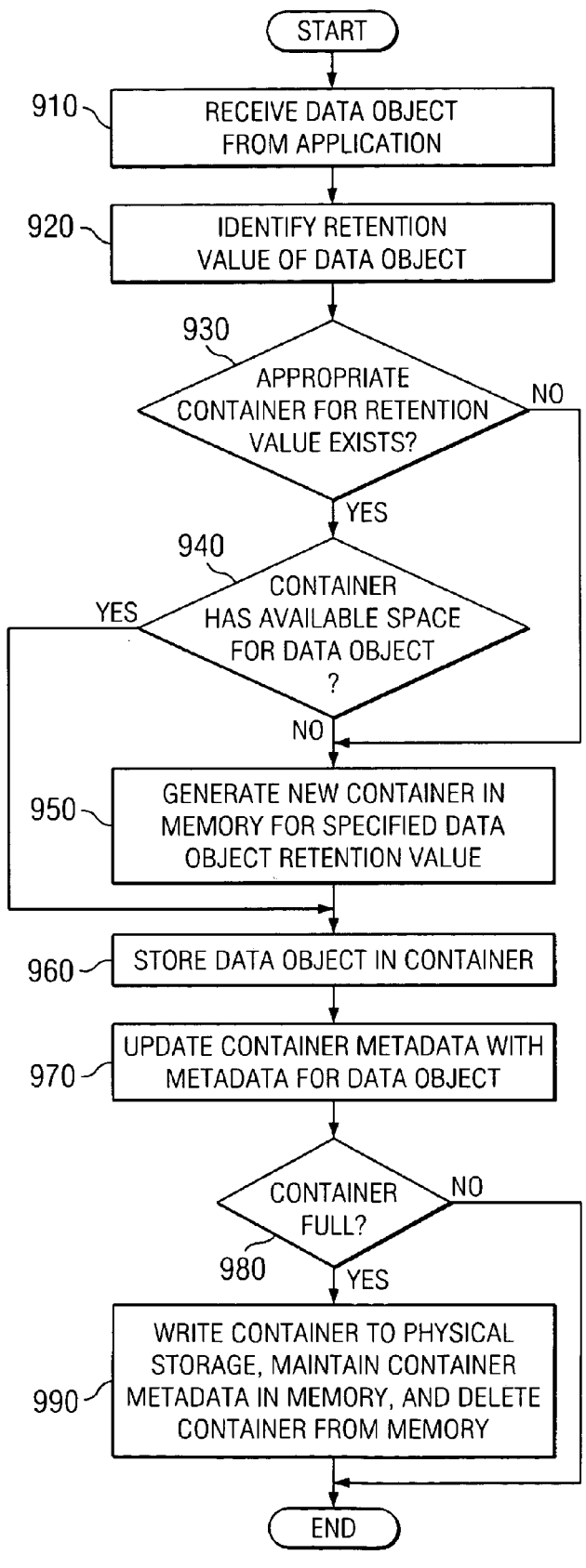
FIG. 9 is a flowchart outlining an exemplary process for storing a data object in a container in a storage system in accordance with one exemplary embodiment of the present invention.

FIG. 9 is a flowchart outlining an exemplary process for storing a data object in a container in a storage system in accordance with one exemplary embodiment of the present invention. As shown in FIG. 9, the operation starts by receiving a data object from an application (step 910). As described previously above, the application, at data object creation time, associates the data object with a retention value and a decay function that are indicative of the expected lifetime of the data object within the data storage system. Upon receipt of the data object, the retention value of the data object is identified (step 920) and a determination is made as to whether an appropriate container having a similar retention value is available for the data object (step 930). If a container is not available in memory for the data object, based on the retention value of the data object, a new container is generated in memory for the specified data object retention value (step 950). This may involve generating a metadata file in memory for storing attributes of the container including the container's retention value, identifiers of data objects stored in the container, retention values of the data objects in the container, decay functions of the data objects in the container, and the like.

Alternatively, if an appropriate container is available in memory, a determination is made as to whether the container has sufficient storage space for the data object (step 940). If not, again a new container may be generated in memory for the specified data object retention value (step 950). If an appropriate container is available and has sufficient space for the data object (steps 930 and 940), or if a new container is created for storing the data object (step 950), the data object is stored in the identified container in memory (step 960). Container metadata is updated with the metadata for the data object (step 970).

A determination is then made as to whether the container is full, a predetermined amount of time has expired since creation of the container, or the container is explicitly flushed (step 980). That is, a determination is made as to whether the addition of the data object to the container results in a full container that should be written to physical storage or if some other event has occurred requiring writing of the container to physical storage. If the container is not full, the operation terminates. If the container is full, the container, i.e. the data objects within the container, are written to one or more segments of physical storage in a single high-bandwidth operation (step 990). The metadata for the container is maintained in memory and may be updated with pointers to the physical storage locations of the data objects. In addition, the container data structure may be deleted from memory so that the memory is freed for reuse or may be cached for some time to allow the system to avoid disk accesses. The operation then terminates.

Figure 10:
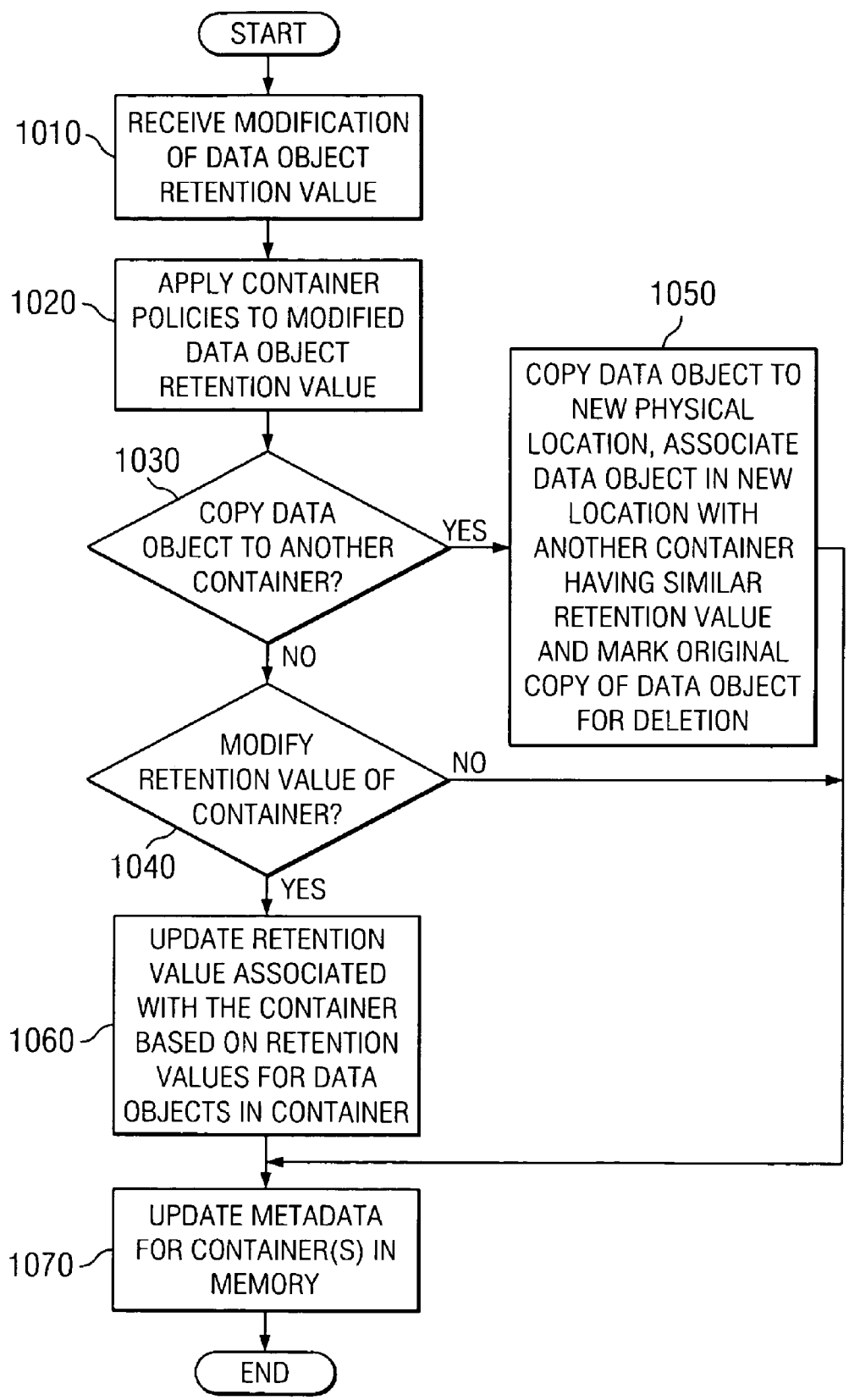
FIG. 10 is a flowchart outlining an exemplary process for handling a modification of a retention value of a data object in accordance with one exemplary embodiment of the present invention.

FIG. 10 is a flowchart outlining an exemplary process for handling a modification of a retention value of a data object in accordance with one exemplary embodiment of the present invention. As shown in FIG. 10, a modification to a data object retention value is received (step 1010). This may be an explicit modification by an application or may be the result of an application of a decay function associated with the data object to the retention value of the data object, for example. Thereafter, container policies for handling modifications to attributes of data objects in containers are applied to the modified data object retention value (step 1020). Based on the application of these container policies, a determination is made as to whether the data object is to be moved to another container (step 1030).

If the data object is to be moved to another container, the data object is copied to a new physical storage location and the data object at the new physical location is associated with the other container having a retention value that is similar to the modified retention value of the data object (step 1050). In addition, the original copy of the data object may be marked for deletion. Metadata associated with the object may be updated to allow future accesses to the object to use the new copy.

If, by application of the container policies, it is determined that the data object is not to be moved to another container, a determination is made as to whether to modify the retention value of the container (step 1040). If the retention value of the container is to be modified, the retention value associated with the container is updated based on the retention values for the data objects in the container (step 1060). Thereafter, after the data object has been moved to another container, or if the change in the retention value of the data object is to be ignored, the metadata for the container(s) is updated in memory based on the particular change in retention value of the data object and any resulting changes to containers as a consequence of the change to the retention value of the data object (step 1070). The operation then terminates.

Figure 11:
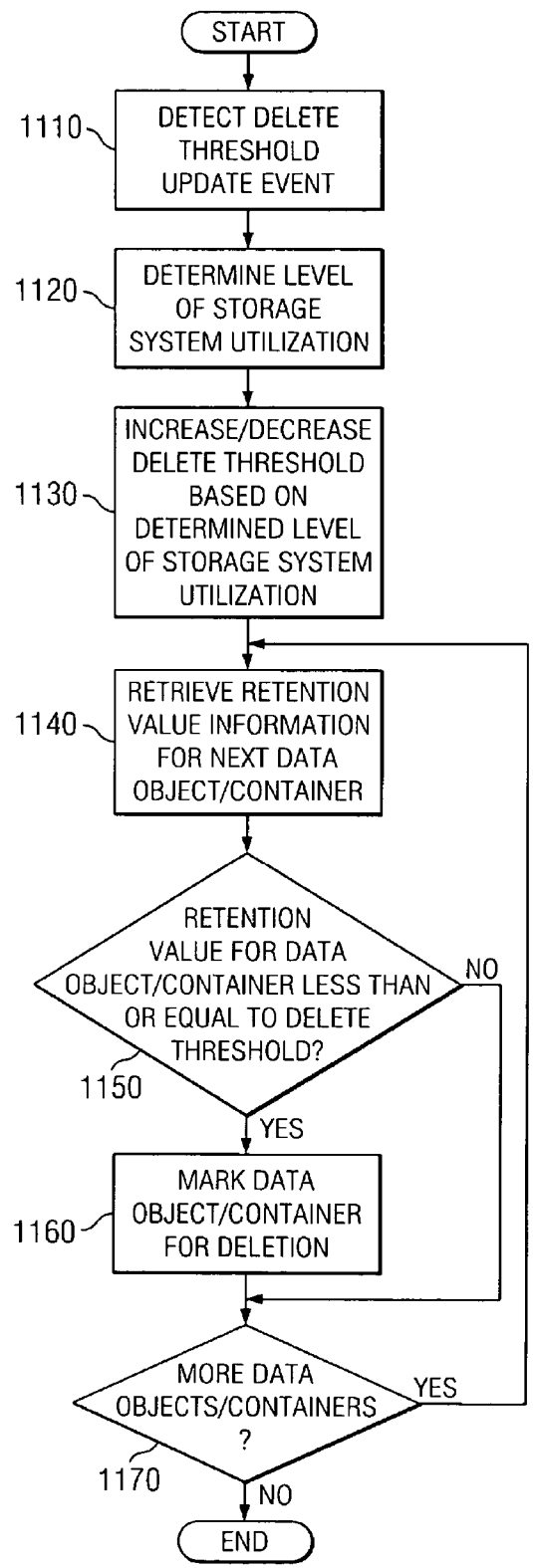
FIG. 11 is a flowchart outlining an exemplary process for deleting data objects/containers from a storage system in accordance with one exemplary embodiment of the present invention.

FIG. 11 is a flowchart outlining an exemplary process for deleting data objects/containers from a storage system in accordance with one exemplary embodiment of the present invention. As shown in FIG. 11, the operation starts by detecting a delete threshold update event (step 1110). This event may be a periodic event (e.g., every 5 minutes), may be a continuous event, or may be a specific event (e.g., creation of a new data object) in a set of one or more specific events that trigger updating of the delete threshold.

A level of storage system utilization is then determined (step 1120). For example, the storage system may determine a ratio of used to available storage space as an indication of storage system utilization. Based on this level of storage system utilization, the delete threshold may be either increased or decreased (step 1130). In a preferred embodiment, as described previously, as storage system utilization increases, the delete threshold is increased between the values of 0 and 1. As a result, with increased delete threshold, there will be more containers and data objects that have retention values that are less than the delete threshold.

The retention value information for a next data object/container in the storage system is obtained (step 1140) and a determination is made as to whether the retention value of the data object/container is less than or equal to the delete threshold (step 1150). If so, the data object/container is marked for deletion (step 1160). If the retention value of the data object/container is greater than the delete threshold, then the data object/container is not marked for deletion. A determination is then made as to whether there are additional data objects/containers to evaluate (step 1170). If so, the operation returns to step 1140 where the next data object/container retention value information is obtained and the process is repeated. Otherwise, if there are no further data objects/containers to process, the operation terminates.

Thus, the present invention provides a mechanism by which data objects are assigned a retention value and decay function that provides an indication of the life of the data object in the storage system and which is used along with a dynamically updated deletion threshold to automatically control the storage system utilization. With the present invention, the retention value and delete threshold provide a mechanism for identifying data objects/containers that should be deleted from the storage system because they have outlived their useful life. Containers provide a mechanism to delete objects in large contiguous units, permitting later large contiguous writes that improve system efficiency. The decay function provides a mechanism for gradually removing data objects from a storage system by reducing the data object's retention value over time. In this way, the present invention provides an improved data storage system in which data objects are written and deleted in bulk and data objects/containers are deleted without requiring explicit deletion commands from applications.

As mentioned above, in a second aspect of the present invention, data objects and/or containers of data objects may be prioritized by their respective retention values. This prioritization may be used to determine which data objects/containers to delete when storage space needs to be freed for storing new data objects/containers of data objects. This deletion may be performed based on a delete threshold, a sorted list of retention values for data objects/containers, or the like. Furthermore, this prioritization may be used in conjunction with or separate from the other aspects of the present invention described above.

Figure 12:
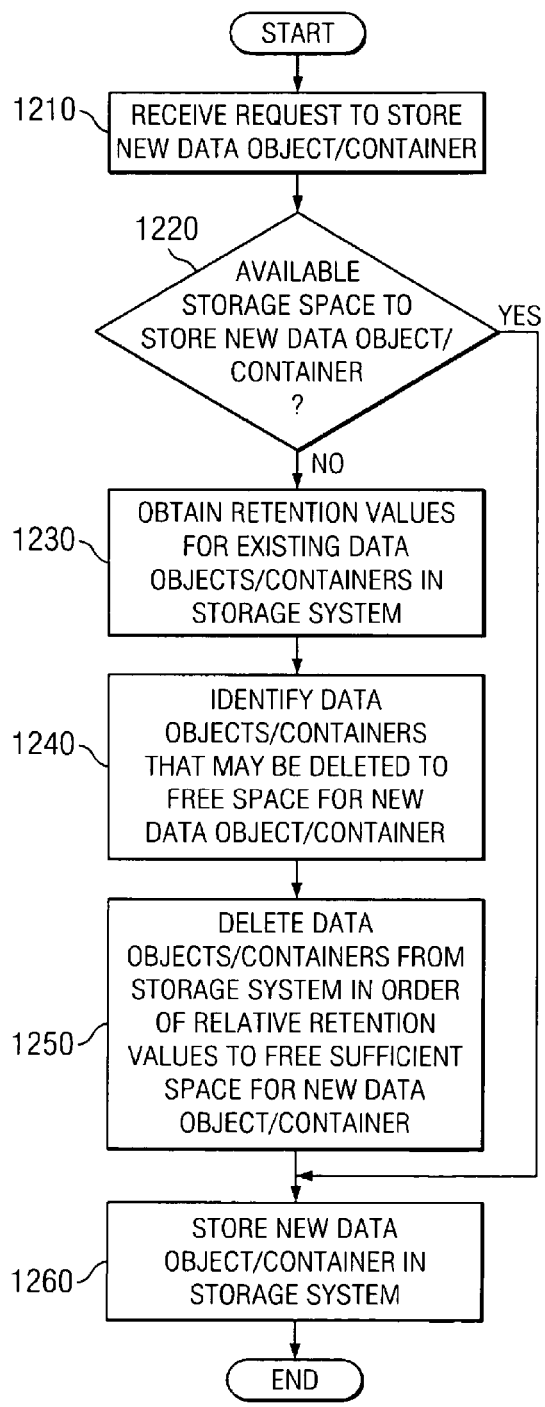
FIG. 12 is a flowchart outlining an exemplary operation of the present invention when prioritizing data objects/containers of data objects in order to maintain a fully utilized storage system.

FIG. 12 is a flowchart outlining an exemplary operation of the present invention when prioritizing data objects/containers of data objects in order to maintain a fully utilized storage system. Although the steps shown in FIG. 12 are illustrated in a serial manner for clarity, many of the operations shown in FIG. 12 may be performed in parallel without departing from the spirit and scope of the present invention. For example, typically the deleting of existing data objects/containers will be performed in parallel with the writing of new data objects/containers to the storage system.

As shown in FIG. 12, the operation starts when a request to store a new data object/container to the storage system is received (step 1210). A determination is made as to whether there is available storage space to store the new data object/container (step 1220). If there is available storage space, the data object/container is stored to the storage system and appropriate data structures for managing the new data object/container in the storage system are updated (step 1260).

If there is not sufficient storage space for storing the data object/container, the retention values for the existing data objects/containers in the storage system are retrieved (step 1230). A determination is made, based on these retention values, as to which existing data objects/containers may be deleted in order to make available storage space for the new data objects/containers (step 1240). This determination may be made based on a delete threshold, a sorted list of retention values, or the like.

The identified data objects/containers that may be deleted are then deleted in order of their retention values, e.g., lowest relative retention value being deleted first, until a sufficient amount of storage space for the new data object/container is made available (step 1250). The new data object/container is then stored in the storage system and data structures, e.g., the sorted list of retention values, for managing the new data object/container in the storage system are updated (step 1260). The operation then ends but may be repeated for subsequent storage requests in order to maintain a fully utilized storage system that permits storage of new data objects/containers of data objects.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of storing data in a data storage system, comprising:
   receiving a plurality of data objects, wherein each data object of the plurality of data objects has an associated expected lifetime identifier that identifies criteria indicative of an amount of time the associated data object is expected to be retained in the data storage system, wherein each expected lifetime identifier comprises a retention value that indicates a relative importance of retaining the associated data object and an associated modification function for modifying the retention value and wherein the retention value is selected from a range of numbers between and including a first real number and a second real number; and
   wherein the first real number is a lowest number of the range of numbers indicating the associated data object is not to be retained and the second real number is a highest number of the range of numbers indicating the associated data object is not to be deleted;
   grouping a subset of the data objects into a data container in a storage device based on the data objects having a similar expected lifetime identifier; and
   writing the subset of the data objects in the data container out to physical storage in response to an occurrence of an event, wherein the method further comprises:
   receiving a modification of a retention value of a data object of the subset of the data objects;
   determining whether the data object of the subset of the data objects is to be moved to another data container; and
   in response to determining that the data object of the subset of the data objects is to be moved to another data container, associating the data object of the subset of the data objects with another data container containing other data objects that have a retention value that is similar to the modified retention value of the data object of the subset of the data objects.

2. The method of claim 1, wherein each data object of the plurality of data objects is annotated, by an application at data object creation time, with the associated expected lifetime identifier.

3. The method of claim 1, wherein the criteria are one of periods of time or relative priorities.

4. The method of claim 2, wherein the associated modification function defines how the retention value changes over time.

5. The method of claim 4, wherein the associated modification function is a decay function that reduces the retention value over time; and
wherein as the retention value increases, the amount of time to reduce the retention value increases by an order of magnitude.

6. The method of claim 1, further comprising:
determining if an expected lifetime identifier of a data object of the subset of the data objects in the data container has a predetermined relationship with a deletion threshold; and
deleting all of the data objects of the subset of the data objects in the data container, in response to determining that the expected lifetime identifier of the data object of the subset of the data objects in the data container has the predetermined relationship with the deletion threshold.

7. The method of claim 6, wherein the predetermined relationship is that the expected lifetime identifier has a value that is less than or equal to the value of the deletion threshold, and further comprising dynamically updating a value of the deletion threshold based on a current utilization of the storage system, wherein dynamically updating a value of the deletion threshold includes:
determining a current level of usage of the storage system;
increasing the value of the deletion threshold if the current level of usage of the storage system indicates an increase in usage of the storage system; and
decreasing the value of the deletion threshold if the current level of usage of the storage system indicates a decrease in usage of the storage system.

8. The method of claim 4, wherein each of the expected lifetime identifiers and each of the associated modification functions are maintained in a metadata data structure in memory after writing of the subset of the data objects in the data container out to physical storage, and wherein the data container is deleted from memory after writing of the subset of the data objects in the data container out to physical storage.

9. The method of claim 1, wherein the event is one of the data container becoming full, an elapse of a predetermined period of time, and a flush of the data container.

10. The method of claim 1, wherein the event is detecting that an expected lifetime identifier of a data object of the subset of the data objects in the data container has been changed a predetermined number of times or more in a predetermined period of time, and wherein writing the subset of the data objects in the data container out to physical storage in response to the occurrence of an event includes writing the data object of the subset of the data objects in the data container out to a different physical storage than data objects whose expected lifetime identifiers have not changed a predetermined number of times or more in a predetermined period of time.

11. The method of claim 1, wherein determining whether the data object of the subset of the data objects is to be moved to another data container, comprises:
determining whether the data object of the subset of the data objects is to be moved based on applying data container policies for handling modifications to attributes of data objects.

12. The method of claim 1, and further comprising:
in response to determining that the data object of the subset of the data objects is to be moved to another data container, also marking the data object of the subset of the data objects in the data container for deletion.

13. The method of claim 1, and further comprising:
in response to determining that the data object of the subset of the data objects is to be moved to another data container, determining whether to modify the retention value associated with the data container; and
in response to determining that the retention value associated with the data container is to be modified, updating the retention value associated with the data container.

14. The method of claim 13, and further comprising:
in response to determining that the data object of the subset of the data objects is not to be moved to another data container, updating metadata for the data container.

15. A computer program product for storing data in a data storage system, the computer program product comprising:
a computer usable recordable-type media having computer executable instructions stored thereon, the computer executable instructions comprising:
computer executable instructions for receiving a plurality of data objects, wherein each data object of the plurality of data objects has an associated expected lifetime identifier that identifies criteria indicative of an amount of time the associated data object is expected to be retained in the data storage system, wherein each expected lifetime identifier comprises a retention value that indicates a relative importance of retaining the associated data object and an associated modification function for modifying the retention value and wherein the retention value is selected from a range of numbers between and including a first real number and a second real number; and
wherein the first real number is a lowest number of the range of numbers indicating the associated data object is not to be retained and the second real number is a highest number of the range of numbers indicating the associated data object is not to be deleted;
computer executable instructions for grouping a subset of the data objects into a data container in a storage device based on the data objects having a similar expected lifetime identifier; and
computer executable instructions for writing the subset of the data objects in the data container out to physical storage in response to the occurrence of an event, wherein the computer program product further comprises:
computer executable instructions for receiving a modification of a retention value of a data object of the subset of the data objects;
computer executable instructions for determining whether the data object of the subset of the data objects is to be moved to another data container; and
computer executable instructions in response to determining that the data object of the subset of the data objects is to be moved to another data container, for associating the data object of the subset of the data objects with another data container containing other data objects that have a retention value that is similar to the modified retention value of the data object of the subset of the data objects.

16. The computer program product of claim 15, wherein each data object of the plurality of data objects is annotated, by an application at data object creation time, with the associated expected lifetime identifier.

17. The computer program product of claim 15, wherein the criteria are one of periods of time or relative priorities.

18. The computer program product of claim 16, wherein the associated modification function defines how the retention value changes over time.

19. The computer program product of claim 18, wherein the modification function is a decay function that reduces the retention value over time; and wherein as the retention value increases, the amount of time to reduce the retention value increases by an order of magnitude.

20. The computer program product of claim 15, further comprising:

computer executable instructions for determining if an expected lifetime identifier of a data object of the subset of the data objects in the data container has a predetermined relationship with a deletion threshold; and computer executable instructions for deleting all of the data objects of the subset of the data objects in the data container, in response to determining that the expected lifetime identifier of the data object of the subset of the data objects in the data container has the predetermined relationship with the deletion threshold.

21. The computer program product of claim 20, wherein the predetermined relationship is that the expected lifetime identifier has a value that is less than or equal to the value of the deletion threshold, and further comprising:

computer executable instructions for dynamically updating a value of the deletion threshold based on a current utilization of the storage system, wherein the sixth instructions for dynamically updating a value of the deletion threshold includes:

computer executable instructions for determining a current level of usage of the storage system;

computer executable instructions for increasing the value of the deletion threshold if the current level of usage of the storage system indicates an increase in usage of the storage system; and computer executable instructions for decreasing the value of the deletion threshold if the current level of usage of the storage system indicates a decrease in usage of the storage system.

22. The computer program product of claim 18, wherein each of the expected lifetime identifiers and each of the associated modification functions are maintained in a metadata data structure in memory after writing of the subset of the data objects in the data container out to physical storage, and wherein the data container is deleted from memory after writing of the subset of the data objects in the data container out to physical storage.

23. The computer program product of claim 15, wherein the event is one of the data container becoming full, an elapse of a predetermined period of time, and a flush of the data container.

24. The computer program product of claim 15, wherein the event is detecting that an expected lifetime identifier of a data object of the subset of the data objects in the data container has been changed a predetermined number of times or more in a predetermined period of time, and wherein the computer executable instructions for writing the data objects of the subset of the data objects in the data container out to physical storage in response to the occurrence of an event includes computer executable instructions for writing the data object of the subset of the data objects in the data container out to a different physical storage than data objects whose expected lifetime identifiers have not changed a predetermined number of times or more in a predetermined period of time.

25. A system for storing data, comprising:

a memory storing computer executable instructions; and a processor executing the computer executable instructions for:

receiving a plurality of data objects, wherein each data object of the plurality of data objects has an associated expected lifetime identifier that identifies criteria indicative of an amount of time the associated data object is expected to be retained in the data storage system, wherein each expected lifetime identifier comprises a retention value that indicates a relative importance of retaining the associated data object and an associated modification function for modifying the retention value and wherein the retention value is selected from a range of numbers between and including a first real number and a second real number; and wherein the first real number is a lowest number of the range of numbers indicating the associated data object is not to be retained and the second real number is a highest number of the range of numbers indicating the associated data object is not to be deleted;

grouping a subset of the data objects into a data container in a storage device based on the data objects having a similar expected lifetime identifier; and writing the subset of the data objects in the data container out to physical storage in response to an occurrence of an event, wherein the processor further executes the instructions for:

receiving a modification of a retention value of a data object of the subset of the data objects;

determining whether the data object of the subset of the data objects is to be moved to another data container; and in response to determining that the data object of the subset of the data objects is to be moved to another data container, associating the data object of the subset of the data objects with another data container containing other data objects that have a retention value that is similar to the modified retention value of the data object of the subset of the data objects.

26. The computer program product of claim 15, wherein the computer executable instructions for determining whether the data object of the subset of the data objects is to be moved to another data container, comprises:

computer executable instructions for determining whether the data object of the subset of the data objects is to be moved based on applying data container policies for handling modifications to attributes of data objects.

27. The computer program product of claim 15, and further comprising:

computer executable instructions in response to determining that the data object of the subset of the data objects is to be moved to another data container, for also marking the data object of the subset of the data objects in the data container for deletion.

28. The computer program product of claim 15, and further comprising:

computer executable instructions in response to determining that the data object of the subset of the data objects is to be moved to another data container, for determining whether to modify the retention value associated with the data container; and computer executable instructions in response to determining that the retention value associated with the data container is to be modified, for updating the retention value associated with the data container.

29. The computer program product of claim 28, and further comprising:

computer executable instructions in response to determining that the data object of the subset of the data objects is not to be moved to another data container, for updating metadata for the data container.

* * * * *